(12) United States Patent
Tanaka

(10) Patent No.: US 7,608,298 B2
(45) Date of Patent: Oct. 27, 2009

(54) METHOD OF MANUFACTURING CERAMIC POROUS MEMBRANE

(75) Inventor: Kei Tanaka, Gifu-prefecture (JP)

(73) Assignee: NGK Insulators, Ltd., Nagoya (JP)

(*) Notice: Subject to any disclaimer, the term of this patent is extended or adjusted under 35 U.S.C. 154(b) by 20 days.

(21) Appl. No.: 11/858,973

(22) Filed: Sep. 21, 2007

(65) Prior Publication Data

US 2008/0069950 A1 Mar. 20, 2008

Related U.S. Application Data

(63) Continuation of application No. PCT/JP2007/052407, filed on Feb. 9, 2007.

(30) Foreign Application Priority Data

Feb. 16, 2006 (JP) .............................. 2006-039661

(51) Int. Cl.
  B05D 7/22 (2006.01)
  B05D 3/12 (2006.01)
(52) U.S. Cl. ..................... 427/235; 427/238; 427/350
(58) Field of Classification Search ......... 427/230–239, 427/350, 369
  See application file for complete search history.

(56) References Cited

U.S. PATENT DOCUMENTS

| 4,719,058 A | 1/1988 | Komoda |
| 4,929,406 A | 5/1990 | Abe et al. |
| 4,971,696 A | 11/1990 | Abe et al. |
| 6,479,099 B1 * | 11/2002 | Takahashi et al. ........... 427/244 |
| 6,509,060 B1 * | 1/2003 | Komoda et al. ............ 427/235 |

FOREIGN PATENT DOCUMENTS

| JP | 61-238315 | 10/1986 |
| JP | 03-267129 | 11/1991 |
| JP | 06-198148 A1 | 7/1994 |
| JP | 07-163848 A1 | 6/1995 |
| JP | 2000-218114 A1 | 8/2000 |
| JP | 2001-259323 A1 | 9/2001 |
| JP | 2001-261464 A1 | 9/2001 |
| JP | 2001-261465 A1 | 9/2001 |
| JP | 2005-324119 A * | 11/2005 |
| JP | 2005-324119 A1 | 11/2005 |

OTHER PUBLICATIONS

English-language translation of the International Search Report for PCT/JP2007/052407, Aug. 19, 2008.*
Asaeda, Masashi, et al., "Separation of inorganic/organic gas mixtures by porous silica membranes", *Separation and Purification Technology.* 25 (2001) pp. 151-159.
Sakuhana, Sumio, "Science of Sol-Gel Process" 1988, pp. 85-95 (w/ partial English translation).

\* cited by examiner

Primary Examiner—William Phillip Fletcher, III
(74) Attorney, Agent, or Firm—Burr & Brown

(57) ABSTRACT

A method of manufacturing a ceramic porous membrane on inner wall surfaces of through holes of a porous base member. The through holes of the base member are arranged in a vertical direction, a ceramic sol liquid having a temperature difference of 50° C. or less between the sol liquid and the base member is supplied to the inner wall surface of the base member, the liquid supply is stopped when the sol liquid exceeds an upper end portion of the base member, and then the sol liquid is extracted from the bottom of the base member. After the sol liquid is completely extracted, a pressure difference is created so that a pressure on the side of an outer peripheral surface of the base member is lower than that on the side of the inner wall surface of the base member.

6 Claims, 3 Drawing Sheets

METHOD OF MANUFACTURING CERAMIC POROUS MEMBRANE

TECHNICAL FIELD

The present invention relates to a method of manufacturing a ceramic porous membrane. More particularly, it relates to a method of manufacturing a ceramic porous membrane in which a uniform porous membrane having less large and coarse pores and less defects and having a small membrane thickness can be formed on an inner surface of a porous base member with less membrane formation times.

BACKGROUND ART

Heretofore, various methods of forming a ceramic porous membrane on porous base members have been known.

For example, a hot coating process is known (see Non-Patent Document 1). This is a method of rubbing a tube base member with a cloth containing a silica sol to apply the silica sol thereto and thereby form a porous membrane on an outer surface of the tube base member heated at about 200° C. In addition, a method of forming a sol into a thin membrane on a substrate of a ceramic or the like by a dipping process is also known (see Non-Patent Document 2). This is a method of dipping the substrate into a dipping liquid and then forming the membrane thereon while pulling up the substrate.

A method of forming a porous membrane on an inner surface of a porous base member having a tubular shape or a cylindrical lotus root-like monolith shape by filtering membrane formation is also known (see Patent Documents 1, 2). The outer surface of the porous base member is held at a pressure lower than that of an inner surface thereof which comes in contact with a sol liquid to form the membrane on the inner surface of the porous base member. A membrane forming method of successively reducing pore diameters to laminate membranes is also known (see Patent Document 3).

However, the hot coating process has a problem that the membrane cannot uniformly be formed on the whole base surface, and the process cannot be applied to the inside of the monolith base having the tubular or cylindrical lotus root-like shape. In the filtering membrane formation process, during drying of the formed membrane, a solvent present in a base member pore sometimes flows out on a membrane side to cause membrane peeling. As a result, there is a problem that a defect is generated in the porous membrane formed on the fired base surface.

Moreover, in the dipping process, the problem generated in the filtering membrane formation process is not generated, but it is difficult to pull up a submerged long and large base member. Therefore, there is difficulty in applying the process to a base member having a large membrane area. The pores having a so-called coarse pore diameter larger than an average pore diameter tend to increase. To prevent this problem, the membrane needs to be thickened.

Furthermore, in a method in which a pressure difference is created between the side of an inner peripheral surface and the side of an outer peripheral surface of the tubular porous base member before the base member comes in contact with the sol liquid, a phenomenon where the solvent filled in the base member pores during the membrane formation flows toward the membrane during the drying and the membrane of nano-level particles peels occurs in the same manner as in the filtering membrane formation process. This results in a problem that the defects are generated in the porous membrane formed on the fired base surface.

Non-Patent Document 1: M. Asaeda et al., "Separation and Purification Technology" 25 (2001) 151 to 159;
Non-Patent Document 2: "Science of Sol-Gel Process" authored by Sumio Sakuhana, Agnes Shofu-sha, pages 85 to 95, 1988;
Patent Document 1: Japanese Patent Application Laid-Open No. 61-238315
Patent Document 2: Japanese Patent Application Laid-Open No. 3-267129; and
Patent Document 3: Japanese Patent Application Laid-Open No. 6-198148.

SUMMARY OF THE INVENTION

The present invention has been developed in view of the above-mentioned problem of the conventional technology, and an object thereof is to provide a method of manufacturing a ceramic porous membrane in which a uniform porous membrane having less coarse and large pores and less defects and having a small thickness can be obtained with less membrane formation times.

As a result of intensive investigation of the present inventors, it has been found that the above-mentioned problem of the conventional technology can be solved by performing vacuum suction from a secondary side (the side of a surface on which any membrane is not formed) of a porous base member after a ceramic sol liquid is completely discharged, and the present invention has been completed.

That is, according to the present invention, there is provided a method of manufacturing a ceramic porous membrane in which the ceramic porous membrane is formed on inner wall surfaces of through holes of a cylindrical or lotus root-like porous base member, the method comprising: installing the porous base member so that the through holes of the base member are arranged in a vertical direction; supplying, to the inner wall surface of the porous base member, a ceramic sol liquid having a temperature difference of 50° C. or less between the ceramic sol liquid and the porous base member; stopping the liquid supply at a stage where the ceramic sol liquid is spread all over the inner wall surface of the porous base member to discharge the ceramic sol liquid from the downside of the porous base member; and creating a pressure difference so that a pressure on the side of an outer peripheral surface of the porous base member is lower than that on the side of the inner wall surface of the porous base member after the discharge of the ceramic sol liquid is completed.

In the present invention, as long as a temperature difference between the porous base member and the ceramic sol liquid is 50° C. or less, a temperature of either the porous base member or the ceramic sol liquid may be higher.

In the present invention, it is preferable that the ceramic sol has an average particle diameter of 1 to 100 nm. It is also preferable that a membrane forming surface of the porous base member has an average pore diameter of 0.1 to 100 nm. The ceramic sol liquid may be supplied to the inner wall surface of the porous base member from the downside or upside of the porous base member, but from operational viewpoints, it is preferable to supply the liquid from the downside of the porous base member.

In the method of manufacturing the ceramic porous membrane of the present invention, to avoid particle diameter changes of sol particles of the sol liquid, it is preferable that the ceramic sol liquid is at 100° C. or less. The ceramic sol liquid and the porous base member may be heated at 100° C. or less so that the temperature difference therebetween is 50° C. or less, preferably 10° C. or less. In this case, as long as the temperature difference between the porous base member and the ceramic sol liquid is 50° C. or less, the temperature of either the porous base member or the ceramic sol liquid may be higher. Furthermore, in the present invention, from the operational viewpoints, it is preferable that a manner of creating the pressure difference is a manner of performing vacuum suction from the outer peripheral surface (a secondary side) of the porous base member.

According to the present invention, since the porous base member is not pulled up but the ceramic sol liquid is supplied and discharged, the present invention can be applied to a large-sized porous base member. Moreover, after discharging the ceramic sol liquid, the pressure difference is created by the vacuum suction or the like so that the pressure on the side of the outer peripheral surface of the porous base member is lower than that on the side of the inner wall surface of the porous base member. Therefore, since the sol liquid preferentially permeates a large defect portion of the porous base member, the defect portion can be repaired with less membrane formation times (thin membranes). As a result, the method of manufacturing the ceramic porous membrane according to the present invention has an excellent effect that a porous membrane having an average pore diameter level of 0.1 to 100 nm and having less coarse and large pores and less defects can be obtained.

DESCRIPTION OF REFERENCE NUMERALS

Figure 1:
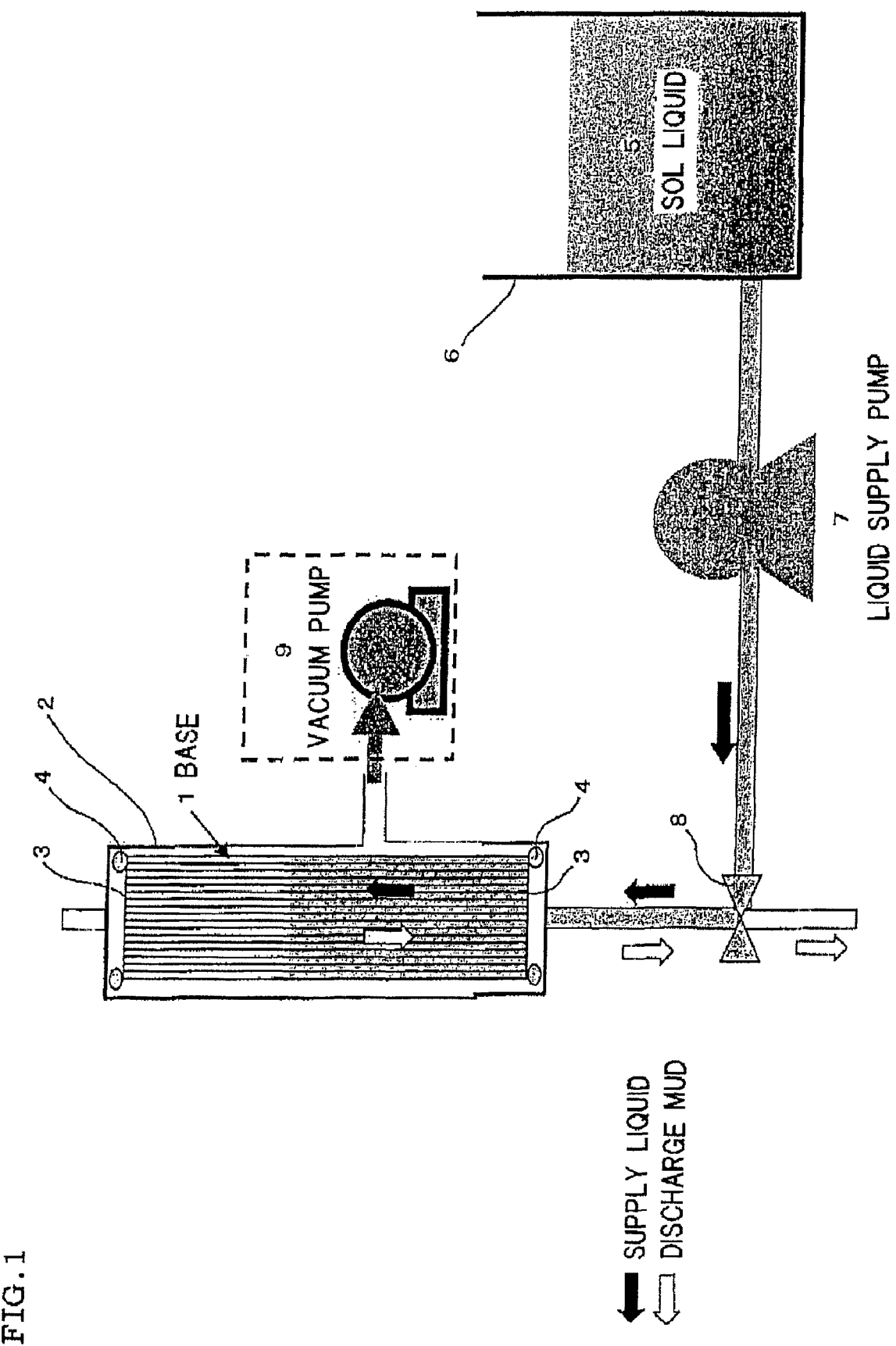
FIG. 1 is a schematic diagram schematically showing one example of a method of manufacturing a ceramic porous membrane according to the present invention.

1: a porous base member, 1a: aggregate particles, 1b: a void portion (a large defect portion) among the aggregate particles, 2: a membrane formation chamber, 3: opposite opening ends of through holes, 4: an O-ring, 5: a ceramic sol liquid, 6: a tank, 7: a liquid supply pump, 8: a valve, 10: the inside of a porous base member, 11a: a ceramic porous membrane and 11b: a fired ceramic porous membrane.

DETAILED DESCRIPTION OF THE INVENTION

The best mode for carrying out the present embodiment will hereinafter be described specifically, but it should be understood that the present invention is not limited to the following embodiment and that design is appropriately modified and improved based on ordinary knowledge of a person skilled in the art without departing from the scope of the present invention.

A method of manufacturing a ceramic porous membrane of the present invention will hereinafter be described in detail.

First, members and materials for use in the manufacturing method of the present invention will be described.

A porous base member (hereinafter sometimes referred to as the "base") mentioned in the present invention is a porous body having a large number of pores having small pore diameters. In a membrane forming surface of the body, pore diameters are preferably 0.1 to 100 nm, more preferably 0.1 to 20 nm. The surface of this porous body may be provided with a porous membrane having the pore diameters in the above range. That is, the porous body may be a so-called asymmetric membrane in which porous membranes are laminated on a base member having large pore diameters so that pore diameters of the membranes are successively reduced.

There is not any special restriction on a material of the base member as long as the material is a porous material. For example, either a ceramic or a metal may be used. However, in consideration of durability, the ceramic is preferable. Specifically, alumina, titania, mullite, zirconia, a mixture of these materials or the like may preferably be used.

In the manufacturing method of the present invention, the membranes can be formed on not only an outer peripheral surface of the base member but also an inner peripheral surface (inner wall surface) of the base member. Therefore, with regard to a shape of the porous base member for use, a comparatively long cylindrical base having a length of 50 cm or more, or a lotus root-like porous base member can preferably be used.

A ceramic sol liquid mentioned in the present invention is a slurry-like ceramic sol liquid for forming a ceramic porous membrane on the inner wall surface of the base member by firing. The membrane can be used as, for example, a separation membrane for a filter. The liquid includes a ceramic sol having an average particle diameter of preferably 1 to 100 nm, more preferably 1 to 50 nm. It is to be noted that there is not any special restriction on a material of the ceramic sol. For example, titania, silica, zirconia, a mixture of these materials or the like is applicable. It is to be noted that there are various methods of measuring the average particle diameter of the sol, but in the present invention, an average value of particle sizes measured by a dynamic scattering process is indicated. Specifically, the particle sizes were measured with DLS-7000 manufactured by Otsuka Electronics Co., Ltd., and a cumulant analysis method was used as a method of calculating the particle sizes.

It is to be noted that in the ceramic sol liquid, an additive for a purpose, for example, a dispersant for improvement of dispersion or a crack preventive agent for preventing cracks during drying of a membrane formed body may be added.

The ceramic sol liquid of the present invention may be prepared independently. However, a commercially available sol liquid having a solid content concentration of 5 to 40%, for example, a titanium isopropoxide hydrolytic sol "TR-20A" (trade name: manufactured by Nissan Chemical Industries, Ltd.) may be used.

Next, a method of manufacturing the ceramic porous membrane according to the present invention will be described with reference to the drawings.

FIG. 1 is a schematic diagram schematically showing one example of the method of manufacturing the ceramic porous membrane according to the present invention. First, a porous base member 1 is installed in a membrane formation chamber 2 so as to arrange through holes of the base member in a vertical direction. It is to be noted that opposite opening ends 3 of the through holes of the base member 1 are fixed with O-rings 4 so that the outer peripheral surface side of the porous base member 1 is isolated from inner portions of the through holes in an airtight manner. A ceramic sol liquid 5 is stored in a tank 6, and is regulated so that a temperature difference between the liquid and the porous base member 1 is 50° C. or less. The ceramic sol liquid 5 regulated in this manner so as to obtain the temperature difference of 50° C. or less between the liquid and the porous base member 1 is supplied to the inner wall surface of the porous base member 1 installed in the membrane formation chamber 2 from the downside thereof by use of a liquid supply pump 7 via a valve

8. In consequence, the ceramic sol liquid 5 comes in contact with the inner wall surface of the porous base member 1. This is schematically shown as a state in FIG. 2(*a*), and is a situation in which the inside 10 of the porous base member 1 is filled with the ceramic sol liquid 5.

Subsequently, the liquid supply is stopped at a stage where the ceramic sol liquid 5 is in excess of an upper end portion of the porous base member 1, and this state is retained for a certain time. Afterward, opening/closing of the valve 8 is adjusted to discharge the ceramic sol liquid 5 from the downside of the porous base member 1. This is a state schematically shown in FIG. 2(*b*).

Subsequently, after the ceramic sol liquid 5 is completely discharged, during drying, vacuum suction is performed from a secondary side (the side of a surface on which any membrane is not formed) of the porous base member 1 by use of a vacuum pump 9. This is a state schematically shown in FIG. 2(*c*), and a ceramic porous membrane 11*a* having a predetermined thickness is formed on the inner wall surface of the porous base member 1. As shown in an enlarged view of FIG. 2(*d*), the ceramic porous membrane 11*a* enters a void portion (a large defect portion) 1*b* among aggregate particles 1*a* constituting a surface portion of the porous base member 1. In the present invention, since the vacuum suction is performed at the stage after the discharge of the ceramic sol liquid 5 in this manner, the ceramic sol liquid 5 preferentially permeates the large defect portion 1*b* of the porous base member 1. Therefore, defects can be repaired with less membrane formation times (thin membranes).

Figure 2:
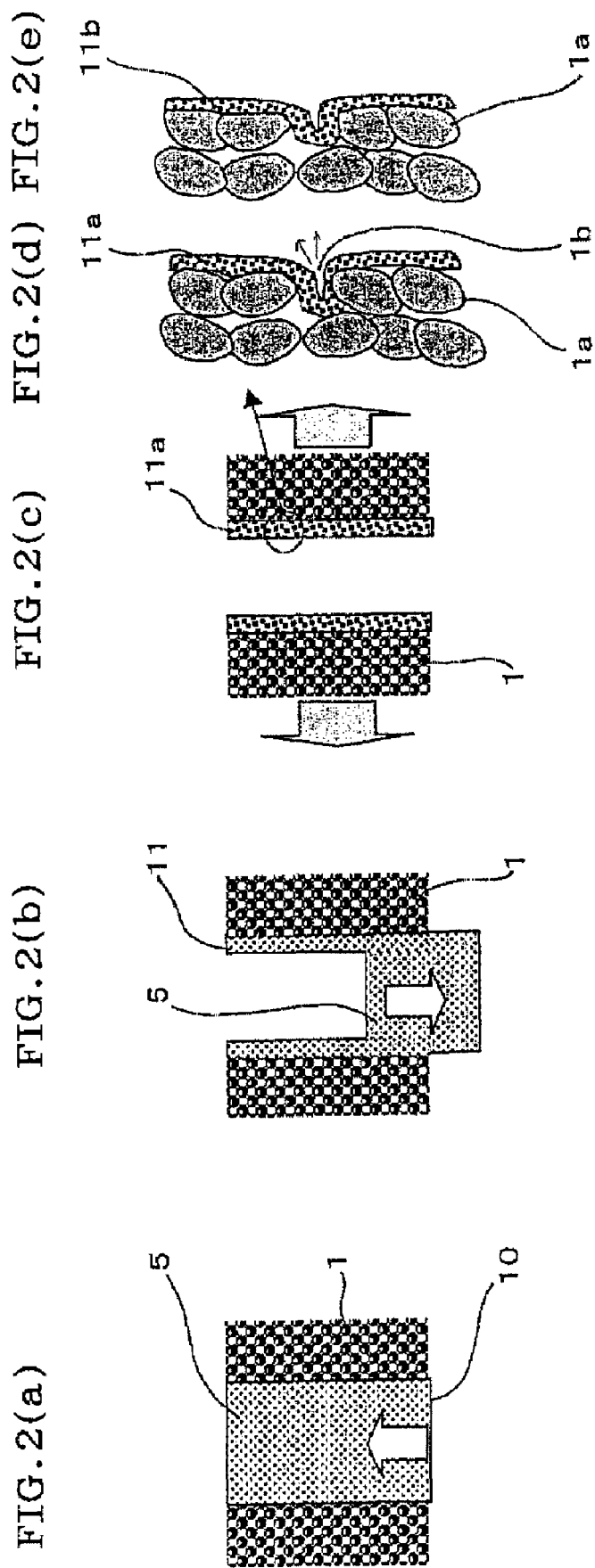
FIG. 2 is a schematic diagram showing one example of a method of forming a membrane (the manufacturing method) according to the present invention.

Subsequently, the porous base member 1 including the ceramic porous membrane formed on the inner wall surface thereof is fired. In consequence, as shown in FIG. 2(*e*), a fired ceramic porous membrane 11*b* is formed and fixed to the inner wall surface of the porous base member 1. Moreover, usually operations of membrane formation and mud discharge steps of FIGS. 2(*a*) and 2(*b*), a drying step of FIGS. 2(*c*) and (*d*) and a firing step of FIG. 2(*e*) are repeated several times. In consequence, the porous base member in which the ceramic porous membrane having a predetermined thickness is formed on the inner wall surface can be manufactured.

In the present invention, it is preferable to retain a temperature of the ceramic sol liquid for use at 100° C. or less. In consequence, particle diameter changes of the sol liquid can be avoided, and the pore diameters of the resultant porous membrane can preferably be controlled into nano levels. On the other hand, when the membrane is formed at a temperature in excess of 100° C., the sol particle diameters of the ceramic sol liquid increase, and the pore diameters of the resultant ceramic porous membrane are not easily controlled.

Moreover, in the present invention, the ceramic sol liquid and the porous base member may be heated at 100° C. or less so that a temperature difference therebetween is 50° C. or less, preferably 10° C. or less. In this case, after the membrane formation, the drying can be completed without relocating the porous base member to a drier or the like.

Furthermore, in the method of the present invention, it is assumed that the temperature difference between the porous base member and the ceramic sol liquid is 50° C. or less. This is because if there is a temperature difference in excess of 50° C. between the porous base member and the ceramic sol liquid, cracks are generated in the porous base member owing to a thermal stress. It is to be noted that as long as the temperature difference between the porous base member and the ceramic sol liquid is 50° C. or less, the temperature of either the porous base member or the ceramic sol liquid may be higher.

It is to be noted that in the above embodiment, the ceramic sol liquid is supplied to the porous base member from the downside of the porous base member, but the present invention is not limited to this embodiment, and the liquid may be allowed to freely fall from the upside of the porous base member.

Moreover, after the membrane formation, air may be passed along the inner surface of the membrane formed in the porous base member to dry the surface.

The present invention has a large characteristic that after the ceramic sol liquid is extracted, a pressure difference is created so that a pressure on the side of the outer peripheral surface of the porous base member is lower than that on the side of the inner wall surface of the porous base member. As a manner of creating the pressure difference, instead of the above-mentioned manner of performing the vacuum suction from the outer peripheral surface (the secondary side) of the porous base member, a manner of pressurizing the porous base member from the inner wall surface (a primary side) of the base member may be used.

According to the above-mentioned method, the base member can be obtained in which the ceramic sol is formed into the membrane on the inner wall surface of the porous base member. When the base member is fired by a firing method at 300 to 1000° C., the porous base member can be manufactured in which the thin-membrane-like ceramic porous membrane having a thickness of about 0.01 to 1 μm and having pore diameters of nano levels of 1 to several nm is formed on the inner wall surface of the base member.

It is to be noted that the porous base member obtained in this manner and provided with the nano-level thin-membrane-like ceramic porous membrane formed on the inner wall surface thereof can preferably be used as a filter.

EXAMPLES

Examples of a manufacturing method of the present invention will hereinafter be described in more detail, but the present invention is not limited to these examples.

First, a porous base member, a ceramic sol liquid, a membrane forming method and a firing method used in the present example will be described.

Example 1

1. Porous Base Member

A porous base member provided with a titania membrane having an average pore diameter of 8 nm and having a lotus root shape (an outer diameter of 30 mm, a length of 1000 mm and 37 cells: an inner diameter of 3 mm of through holes) was used. It is to be noted that opposite end portions of the base member are sealed with glass (e.g., see Japanese Patent Application Laid-Open No. 62-4411).

2. Ceramic Sol Liquid (Sol Liquid A)

Titanium isopropoxide was hydrolyzed at a temperature of 80° C. for 30 minutes under the presence of nitric acid. Afterward, an aging treatment was performed at 90 to 100° C. for three hours, and 4 wt % of sol liquid A was obtained in terms of titania. A sol particle diameter measured by a dynamic optical scattering method was 100 nm.

(Sol Liquid B)

Titanium isopropoxide was hydrolyzed at a temperature of 5° C. for one hour under the presence of nitric acid. Afterward, an aging treatment was performed at 40° C. for ten hours, and 0.5 wt % of sol liquid B was obtained in terms of titania. A sol particle diameter was 30 nm.

(Sol Liquid C)

Tetraethoxy silane was hydrolyzed at a temperature of 60° C. under the presence of nitric acid. Afterward, an aging treatment was performed at 100° C. for ten hours, and 0.3 wt % of sol liquid C was obtained in terms of silica. A sol particle diameter was 5 nm.

3. Membrane Formation

The porous base member was subjected to membrane formation (a manufacturing method) by use of a device shown in FIG. 1.

The sol liquid A was diluted four times with water to obtain a sol liquid 5 for the membrane formation, and the liquid was put into a sol liquid tank 6. It is to be noted that a temperature of the sol liquid was set to 68° C. while the porous base member had a temperature of 20° C. On the other hand, a porous base member 1 was set in a membrane formation chamber 2 so as to arrange through holes of the base member in a vertical direction. Subsequently, the sol liquid 5 was supplied to the porous base member 1 from the downside of the base member with a liquid supply pump 7, it was confirmed that the sol liquid 5 reached an upper surface of the base member, and the liquid supply was then stopped.

After the liquid supply was stopped and the state was retained for 30 seconds, the sol liquid 5 was discharged while regulating a valve 8 so that an average discharge speed of the sol liquid 5 was 10 cm/minute in terms of a membrane surface linear speed.

Immediately after completion of the discharge of the sol liquid 5, reduced pressure suction was started from the outside of the porous base member 1 with a vacuum pump 9. After performing the vacuum suction for ten minutes, the outside (a secondary side) of the porous base member 1 was returned to the atmospheric pressure, and the porous base member 1 was removed.

4. Drying

The resultant porous base member 1 was dried for 12 hours in a drier controlled at 30° C. and a humidity of 50%.

5. Firing

After the drying, the temperature of the porous base member 1 was raised at a ratio of 100° C./hr., retained at 450° C. for 30 minutes, and then lowered at the ratio of 100° C./hr.

Moreover, the above-mentioned operations of 3. membrane formation, 4. drying and 5. firing were repeated five times to obtain the fired porous base member of Example 1.

Example 2

As a material of a porous base member, the same material as that of Example 1 was used, and the porous base member was prepared by the same method as that of Example 1 except that a sol liquid B was used as a sol liquid and both of the sol liquid and the base member had room temperature (20° C.)

Example 3

As a material of a porous base member, the same material as that of Example 2 was used, and the porous base member was prepared by the same method as that of Example 2 except that a sol liquid C was used as a sol liquid.

Comparative Example 1

A porous base member was prepared by the same membrane forming method as that of Example 2 except that reduced pressure suction was not performed.

Comparative Example 2

A porous base member was prepared by the same membrane forming method as that of Example 2 except that reduced pressure suction was started before supplying a sol liquid.

Comparative Example 3

A porous base member was prepared by the same method as that of Example 2 except that a temperature of the porous base member was set to 75° C.

Evaluation:

Pore diameter distributions of the porous base members obtained by Examples 1 to 3 and Comparative Examples 1 and 2 were measured. A measurement principle of pore diameters is the same as that of the method described in Non-Patent Document 1, but in the Non-Patent Document 1, water vapor and nitrogen were used, whereas in the measurement method used in the present invention, n-hexane and nitrogen were used.

Figure 3:
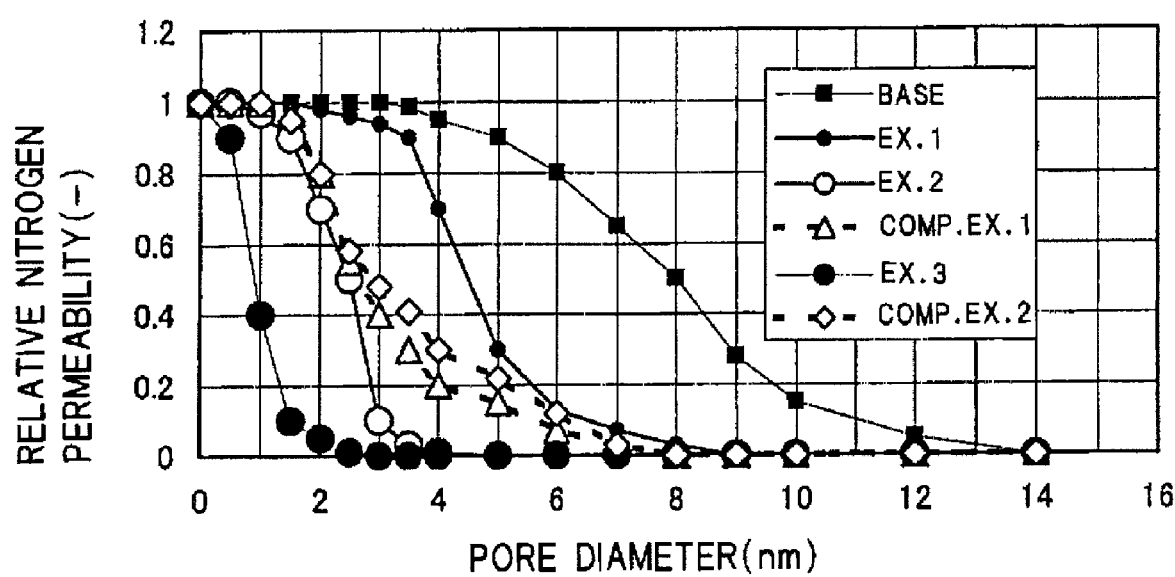
FIG. 3 is a graph showing pore diameter distributions of a porous base member and fired porous base members obtained in Examples 1 to 3 and Comparative Examples 1 and 2.

Results:

The pore diameter distributions of the used porous base members and the fired porous base members obtained in Examples 1 to 3 and Comparative Examples 1 and 2 are shown in Table 1 and FIG. 3.

TABLE 1

| Pore diameter (nm) | Relative nitrogen flow rate | | | | | |
|---|---|---|---|---|---|---|
| | Base | Example 1 | Example 2 | Comparative Example 1 | Comparative Example 2 | Example 3 |
| 0 | 1 | 1 | 1 | 1 | 1 | 1 |
| 0.5 | 1 | 1 | 1 | 1 | 1 | 0.9 |
| 1 | 1 | 1 | 0.97 | 1 | 1 | 0.4 |
| 1.5 | 1 | 1 | 0.9 | 0.97 | 0.95 | 0.1 |
| 2 | 1 | 0.98 | 0.7 | 0.8 | 0.8 | 0.05 |
| 2.5 | 1 | 0.96 | 0.5 | 0.55 | 0.58 | 0.01 |
| 3 | 1 | 0.94 | 0.1 | 0.4 | 0.48 | 0 |
| 3.5 | 0.987 | 0.9 | 0.03 | 0.3 | 0.41 | 0 |
| 4 | 0.95 | 0.7 | 0.01 | 0.2 | 0.3 | 0 |
| 5 | 0.9 | 0.3 | 0 | 0.15 | 0.22 | 0 |
| 6 | 0.8 | 0.13 | 0 | 0.07 | 0.12 | 0 |
| 7 | 0.65 | 0.07 | 0 | 0.03 | 0.03 | 0 |
| 8 | 0.5 | 0.03 | 0 | 0 | 0 | 0 |
| 9 | 0.28 | 0 | 0 | 0 | 0 | 0 |
| 10 | 0.15 | 0 | 0 | 0 | 0 | 0 |
| 12 | 0.05 | 0 | 0 | 0 | 0 | 0 |
| 14 | 0 | 0 | 0 | 0 | 0 | 0 |

As seen from Table 1 and FIG. 3, the porous base member obtained in Example 1 had an average pore diameter of 4.5 nm, and pores having diameters twice or more the average pore diameter were hardly seen. The porous base member obtained in Example 2 had an average pore diameter of 2.5 nm, and pores having diameters twice or more the average pore diameter were hardly seen. Furthermore, the porous base member obtained in Example 3 had an average pore diameter of about 1 nm, and there were considerably few pores having diameters of 2 nm or more.

On the other hand, in the porous base members obtained in the Comparative Examples 1 and 2, it is seen that the average pore diameter is substantially equal to that of Example 2, but there are considerably many pores larger than the average pore diameter. It is to be noted that in Comparative Example 3, since generation of cracks in the base member was recognized before firing, pore diameters could not be measured.

INDUSTRIAL APPLICABILITY

According to a method of manufacturing a ceramic porous membrane of the present invention, a uniform porous membrane having less coarse and large pores and less defects and having a small membrane thickness can be obtained with less membrane formation times. Therefore, a porous base member provided with such a ceramic porous membrane can preferably be used as a filter. Moreover, a porous base member provided with a nano-level thin-membrane-like ceramic porous membrane formed on an inner wall surface thereof can be used in a portion where an organic filter cannot be used, for example, separation removal or the like in an acidic or alkaline solution or an organic solvent.

The invention claimed is:

1. A method of manufacturing a ceramic porous membrane on one or more inner wall surfaces of a porous base member, the method comprising the steps of:
providing a porous base member having a substantially cylindrical outer shape and having one or more through holes formed therein passing from a first end of the porous base member to an opposed second end of the porous base member in a longitudinal axis direction of the porous base member;
orienting the porous base member in a vertical direction so that one of the first and second ends thereof defines a lower base surface and so that the longitudinal axis of the porous base member and the through holes thereof extend in the vertical direction;
supplying, to inner wall surfaces of the one or more through holes of the porous base member, a ceramic sol liquid, wherein a temperature differential between the ceramic sol liquid and the porous base member is 50° C. or less;
stopping the liquid supply at a stage when the ceramic sol liquid entirely covers the inner wall surfaces of the one or more through holes of the porous base member and discharging the ceramic sol liquid from the one of the first and second ends defining the base surface of the porous base member; and
creating a pressure differential, only after the ceramic liquid sol is completely discharged from the porous base member, so that a pressure measured at an outer peripheral surface of the porous base member is lower than a pressure measured inside the one or more through holes of the porous base member.

2. The method of manufacturing the ceramic porous membrane according to claim 1, wherein the ceramic sol has an average particle diameter of 1 to 100 nm.

3. The method of manufacturing the ceramic porous membrane according to claim 1, wherein a membrane forming surface of the one or more through holes of the porous base member has an average pore diameter of 0.1 to 100 nm.

4. The method of manufacturing the ceramic porous membrane according claim 1, wherein the ceramic sol liquid is supplied to the inner wall surfaces of the porous base member from either one of the first and second ends of the porous base member.

5. The method of manufacturing the ceramic porous membrane according to claim 1, wherein a temperature of the ceramic sol liquid does not exceed 100° C.

6. The method of manufacturing the ceramic porous membrane according to claim 1, wherein the pressure differential is created by applying vacuum suction from the outer peripheral surface of the porous base member.

* * * * *